(12) United States Patent
Johnston

(10) Patent No.: US 8,713,927 B2
(45) Date of Patent: *May 6, 2014

(54) WATER DISPLACEMENT APPARATUS

(76) Inventor: Gary Lawrence Johnston, Cowarts, AL (US)

(*) Notice: Subject to any disclaimer, the term of this patent is extended or adjusted under 35 U.S.C. 154(b) by 937 days.

This patent is subject to a terminal disclaimer.

(21) Appl. No.: 12/658,964

(22) Filed: Feb. 17, 2010

(65) Prior Publication Data

US 2010/0148521 A1    Jun. 17, 2010

Related U.S. Application Data

(63) Continuation-in-part of application No. 11/186,352, filed on Jul. 21, 2005, now Pat. No. 7,677,042, which is a continuation of application No. 10/667,584, filed on Sep. 22, 2003, now Pat. No. 6,920,757, which is a continuation-in-part of application No. 10/232,263, filed on Aug. 29, 2002, now Pat. No. 6,651,435.

(51) Int. Cl.
*F04B 17/02*    (2006.01)

(52) U.S. Cl.
USPC .......................................................... 60/398

(58) Field of Classification Search
USPC ........ 290/53, 55; 60/398, 486, 698, 397, 403, 60/405, 400, 401
See application file for complete search history.

(56) References Cited

U.S. PATENT DOCUMENTS

| | | | | |
|---|---|---|---|---|
| 4,055,950 A | * | 11/1977 | Grossman | 60/398 |
| 4,488,055 A | * | 12/1984 | Toyama | 290/53 |
| 6,273,295 B1 | * | 8/2001 | Quartarone et al. | 222/67 |
| 6,920,757 B2 | * | 7/2005 | Johnston | 60/641.11 |

FOREIGN PATENT DOCUMENTS

DE    4120153    * 12/1992

OTHER PUBLICATIONS

Machine-generated translation of DE4120153 Dec. 24, 1992.*

* cited by examiner

*Primary Examiner* — Kenneth Bomberg
*Assistant Examiner* — Shafiq Mian

(57) ABSTRACT

A water displacement apparatus is provided which uses water as a means for transferring energy from the wind and sun into electricity. Wind and the sun may be used to displace water from a water container means. The water container means has a water container member which may be partially submerged in a water supply or reservoir, or it may be connected remotely. The water container means also has a water transport member connected to it, through which water from the water reservoir may move into the water container member. The water from the supply or reservoir will move into the water container member as the water displacement process begins. A conventional windmill system may be used to mechanically displace the water, or an evaporation system utilizing one or more lenses may be used to evaporate the water. An electric generator means may be operatively connected to the water container means in such a manner that the movement of the water through said water transport member may be used to generate electricity. In an alternate configuration, a water condenser means may be connected to the water container means in such a manner that the evaporated water may be transformed back into liquid form and returned to the reservoir or collected for possible residential, commercial, or industrial uses. The various components of the water displacement means and electricity generation means, along with the water condenser means, may also be used in various combinations to displace larger amounts of water.

6 Claims, 18 Drawing Sheets

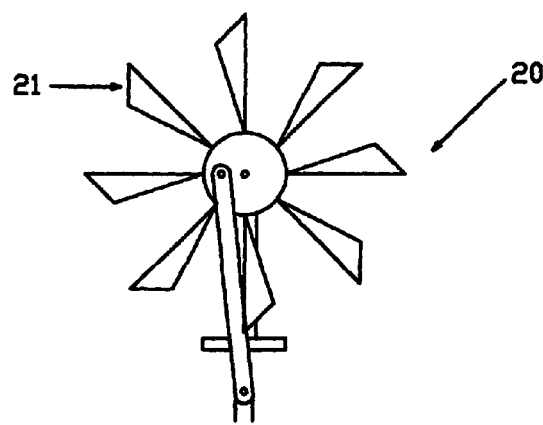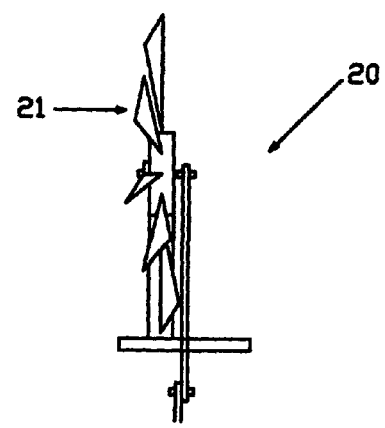
FIGURE 3A    FIGURE 3B
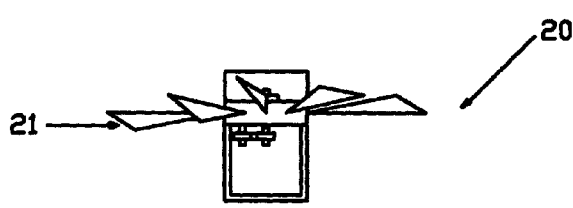
FIGURE 3C

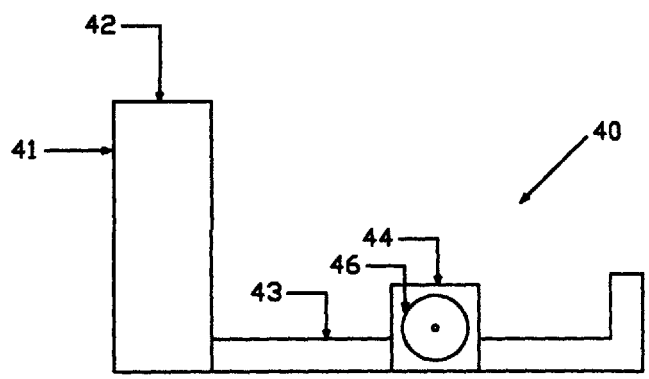
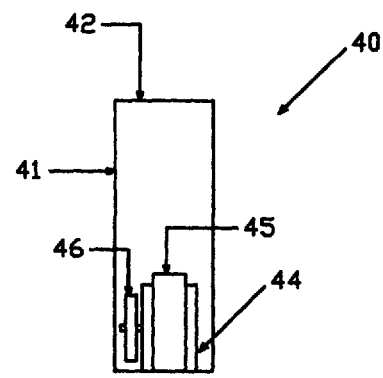
FIGURE 4A
FIGURE 4B
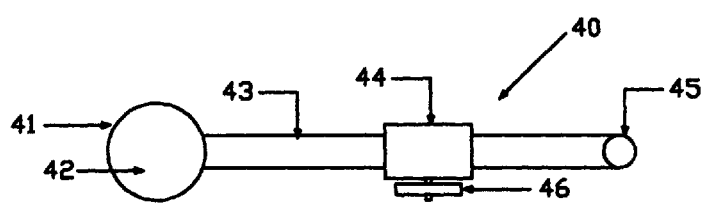
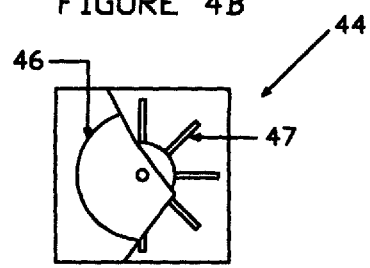
FIGURE 4C
FIGURE 4D

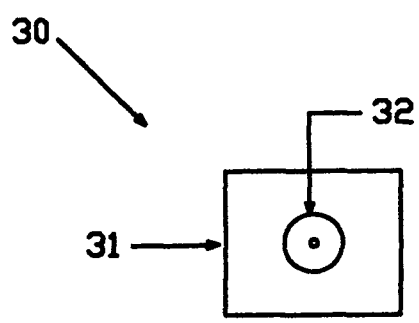
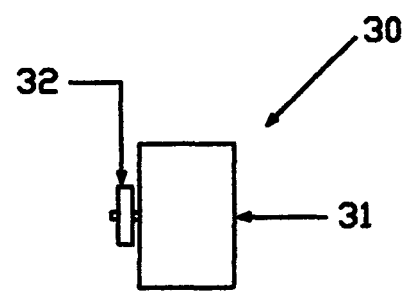
FIGURE 5A  FIGURE 5B
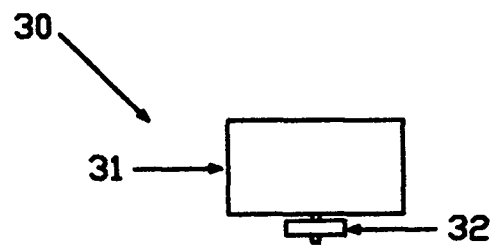
FIGURE 5C

WATER DISPLACEMENT APPARATUS

CROSS-REFERENCE TO RELATED APPLICATION

This application is a Continuation-In-Part to U.S. patent application Ser. No. 11/186,352, filed Jul. 21, 2005, which itself is a Continuation of U.S. patent application Ser. No. 10/667,584, filed Sep. 22, 2003, and is now U.S. Pat. No. 6,920,757, issuing on Jul. 26, 2005. U.S. patent application Ser. No. 10/667,584 is a Continuation-In-Part of U.S. patent application Ser. No. 10/232,263, filed Aug. 29, 2002 and is now U.S. Pat. No. 6,651,435, issuing on Nov. 25, 2003.

BACKGROUND OF THE INVENTION

This invention relates to a liquid displacement apparatus which has a displacement means for displacing liquid contained within a liquid filled container member. The liquid filled container member may be surrounded by a supply or reservoir of liquid, or may be connected remotely. Preferably, the liquid utilized by the apparatus is water. As the liquid or water is removed from the container member, water from the water supply or reservoir will move into the container member through an inlet means, thus replenishing the displaced water. This movement of the water from the container may be used to turn an electric generator, and therefor generate electricity. The movement or displacement of water may be caused by different methods, including removal by a conventional windmill system, or an evaporation system consisting of a lens. Water is thus being used as a means for transferring energy from the wind and sun to an electric generator. Water evaporated from the water container by an evaporation system may be let into the surrounding atmosphere, or may be channeled through a condenser so that it may be converted back into liquid form and collected for possible residential, commercial, or industrial use. Water displaced by the windmill system and the evaporation system may be returned to the supply or reservoir for re-use when an electric generator is utilized.

SUMMARY AND OBJECTS OF THE INVENTION

It is the object of this invention to provide a water displacement apparatus which may provide an inexpensive and clean way of producing electricity. The main purpose of this application is to demonstrate an apparatus which performs the stated function, and to demonstrate the many options and configurations this apparatus may take on.

Briefly stated, the apparatus that forms the basis of the present invention comprises basically a frame structure means, a water displacement means, a water container means, and an electricity generating means. The water displacement means may be a conventional type of windmill system, or an evaporation system using a lens or set of lenses. Accompanying the evaporation system may be a water condenser means for converting evaporated water back into liquid form. The water displacement means and the water container means may all be mounted upon the frame structure means. The electricity generating means and a water condenser means may also mount upon the frame structure means. However, it may be possible to mount the water displacement means, the water container means, the electricity generating means, and the condenser means, upon individual frame structure means, or upon one another.

The design of the apparatus is such that the water displacement means removes water from the water container means, causing water to flow from the water supply or reservoir into the water container member through an inlet means. The inlet may be connected to a water rotation means which is operatively connected to an electricity generating means, so that this water movement into the water container means generates electricity. Similarly the water rotation means and the electricity generating means may connect to an outlet means of the water container means, so that water exiting the water container member may be used by the water rotation means and the electricity generating means to generate electricity. In either case, the water displaced by the apparatus may be used to generate electricity in a very clean and efficient manner.

When a conventional windmill system is used to displaced water, energy from the wind is used to mechanically displace water. As with most conventional windmill systems, the system may utilize a type of wind vane so that it rotates to engage the wind in whatever the direction the wind is blowing. When an evaporation system is used, a lens or series of lenses may be used to direct and concentrate beams from the sun to heat water inside the water container means. As the water inside the water container means heats up, the evaporation process will begin to occur, and the evaporated water will move out of the water container means through an opening or outlet means. In both systems, the water container means may have an inlet submerged in, or connected to, a water supply or reservoir. As the water inside the water container means begins to be displaced, water will begin to move into the water container means through the inlet, thus turning the electric generator.

When an evaporation system is used, the evaporated water may be channeled through a conventional water condensation means, so that the evaporated water may be converted back to a liquid form. The water may be returned to the water supply or reservoir, or it may be captured and treated for possible residential, commercial, and industrial uses. There may also be many other uses for the water displacement apparatus, which will be obvious for someone in a similar industry.

As mentioned previously, the basic function of this apparatus is to use water as a means for transferring energy from the sun and wind to an electric generator. Areas which have a sufficient amount of sun, wind, and water, such as the gulf coast region, can utilize the apparatus as a clean and inexpensive way of generating electricity. And in the case of the evaporation system, the apparatus may be utilized to purify water.

Other objects, features, and advantages for this invention will be apparent from the following detailed description and the appended claims, references being made to the accompanying drawings forming a part of the specification, wherein like reference numerals designate corresponding parts of the several views.

BRIEF DESCRIPTION OF THE DRAWINGS

FIG. 3A is a front view of a conventional windmill system used as a water displacement means for the water displacement apparatus.

FIG. 3B is a side view of a conventional windmill system used as a water displacement means for the water displacement apparatus.

FIG. 3C is a top view of a conventional windmill system used as a water displacement means for the water displacement apparatus.

FIG. 4A is a front view of the water container means of the water displacement apparatus.

FIG. 4B is a side view of the water container means of the water displacement apparatus.

FIG. 4C is a top view of the water container means of the water displacement apparatus.

FIG. 4D is a side view of the water engaging member of the water rotation means of the water container means.

FIG. 5A is a front view of the electricity generation means of the water displacement apparatus.

FIG. 5B is a top view of the electricity generation means of the water displacement apparatus.

FIG. 5C is a side view of the electricity generation means of the water displacement apparatus.

DETAILED DESCRIPTION OF THE PREFERRED EMBODIMENT

Figure 1A:
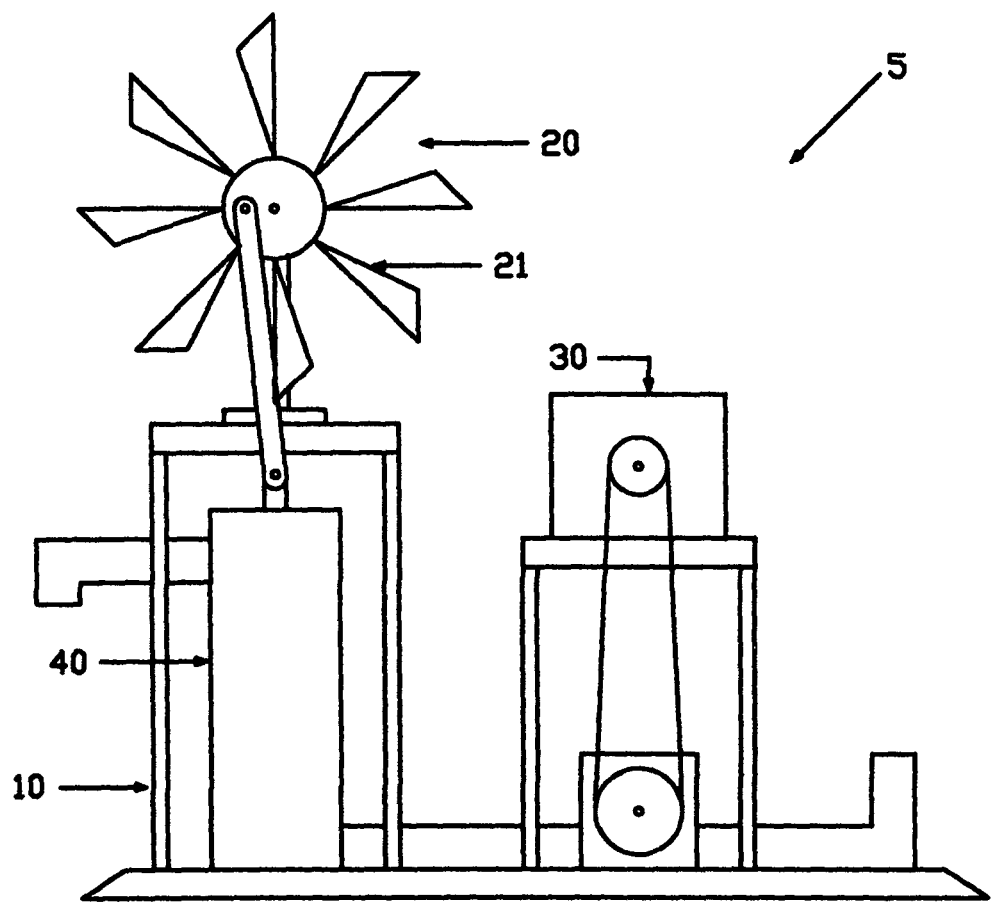
FIG. 1A is a front view of the water displacement apparatus using a conventional windmill system as a water displacement means.
Figure 1B:
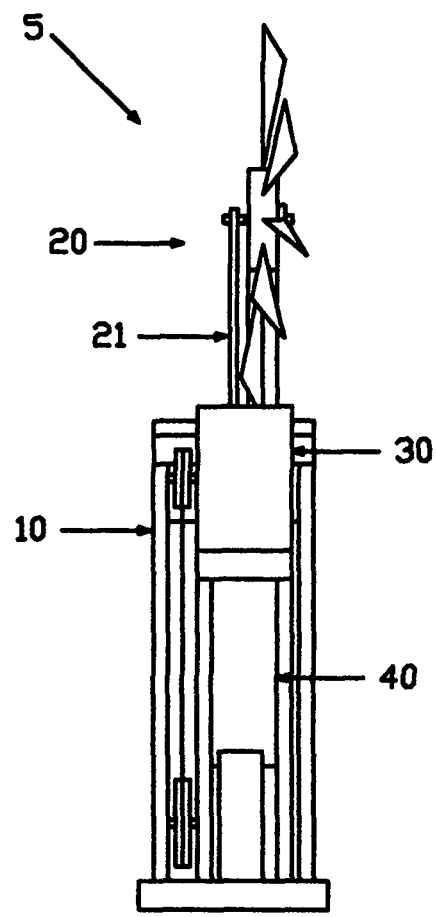
FIG. 1B is a side view of the water displacement apparatus using a conventional windmill system as a water displacement means.
Figure 1C:
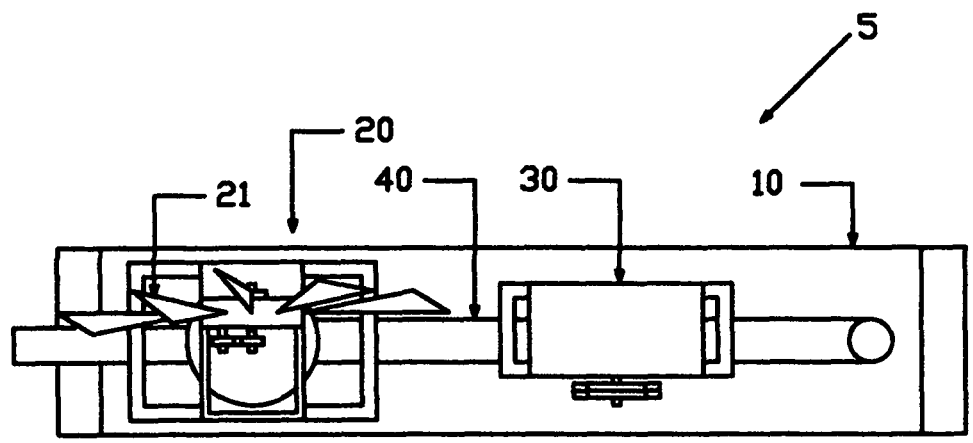
FIG. 1C is a top view of the water displacement apparatus using a conventional windmill system as a water displacement means.
Figure 1D:
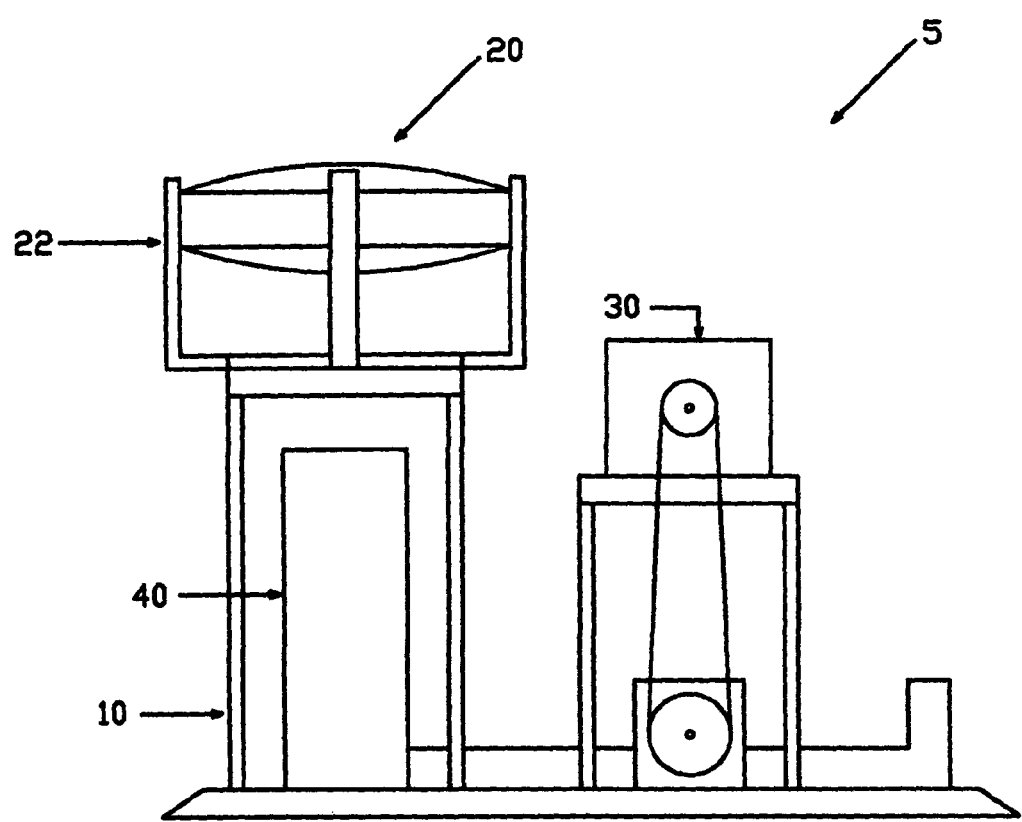
FIG. 1D is a front view of the water displacement apparatus using an evaporation system as a water displacement means.
Figure 1E:
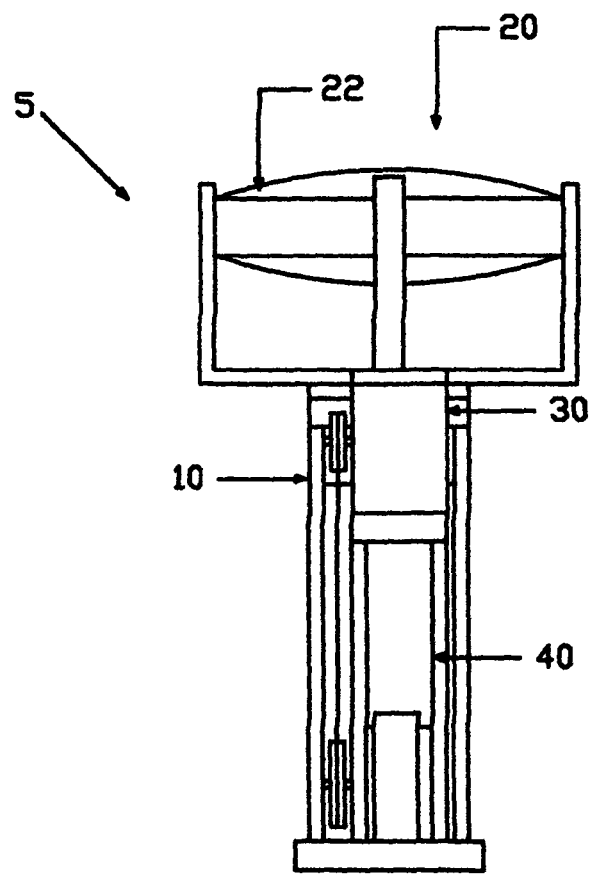
FIG. 1E is a side view of the water displacement apparatus using an evaporation system as a water displacement means.
Figure 1F:
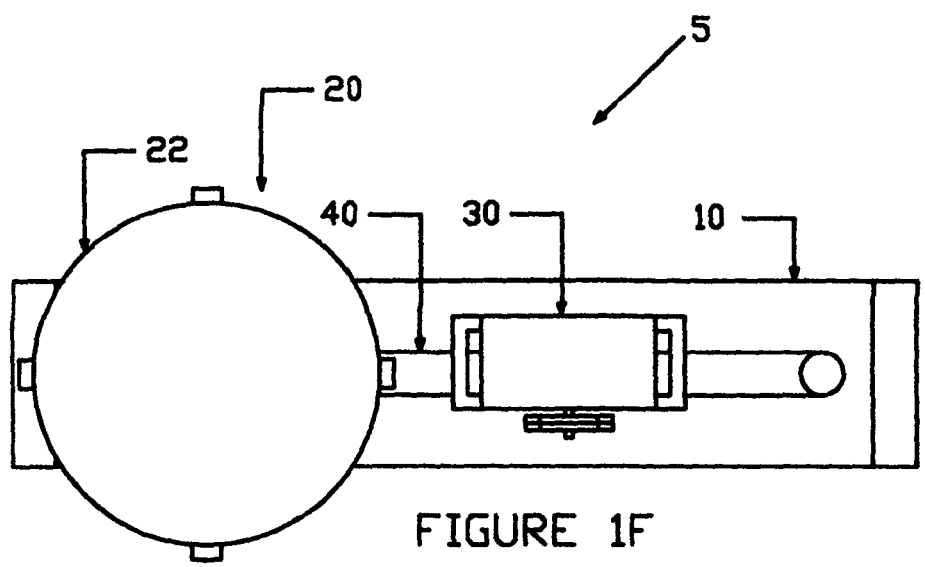
FIG. 1F is a top view of the water displacement apparatus using an evaporation system as a water displacement means.

Before explaining in detail the present invention, it is to be understood that the invention is not limited in its application to the details of construction or arrangement of parts illustrated in the accompanying drawings, since the invention is capable of other embodiments and of being practiced or carried out in various ways. Also, it is to be understood that the phraseology and terminology employed herein is for the purpose of description, and not limitation.

As best can be seen by references to the drawings, and in particular to FIGS. 1A-1F, the water displacement apparatus that forms the basis of the present invention is designated generally by the reference numeral 5, and includes a frame structure means 10, a water container means 40, a water displacement means 20, and an electricity generation means 30. As may be seen, the water displacement means 20 may be a conventional windmill system 21 or an evaporation system 22. The water container means 40, the water displacement means 20, and the electricity generating means 30 are all preferrably mounted on frame structure means 10. However, each could be mounted upon one other, to their own frame structure, or some combination, and the apparatus would also operate as intended.

Figure 2A:
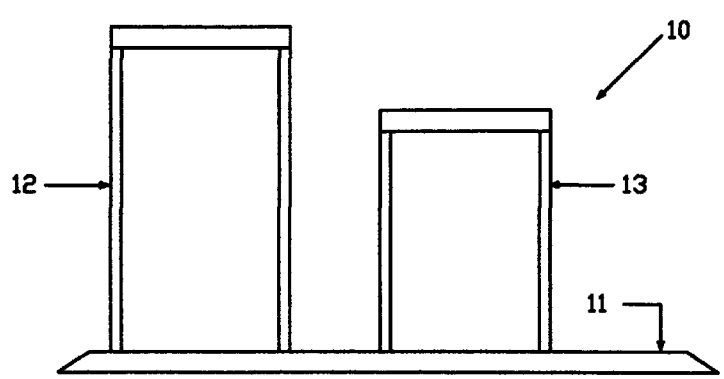
FIG. 2A is a front view of the frame structure means of the water displacement apparatus.
Figure 2B:
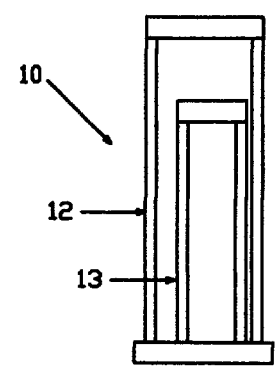
FIG. 2B is a side view of the frame structure means of the water displacement apparatus.
Figure 2C:
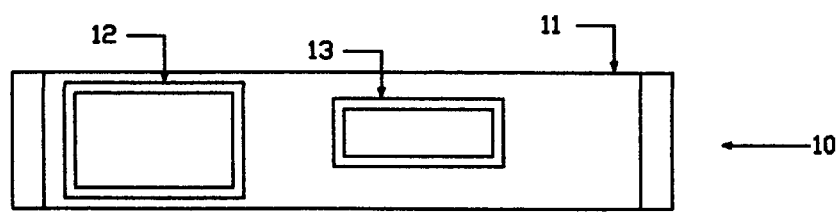
FIG. 2C is a top view of the frame structure means of the water displacement apparatus.
Figure 3D:
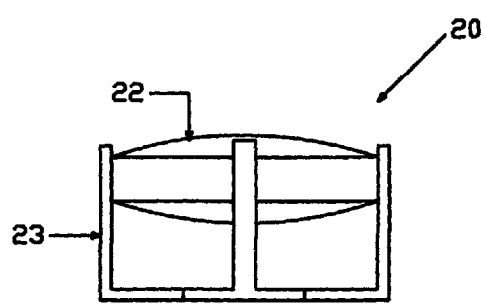
FIG. 3D is a front view of an evaporation system used as a water displacement means for the water displacement apparatus.
Figure 3E:
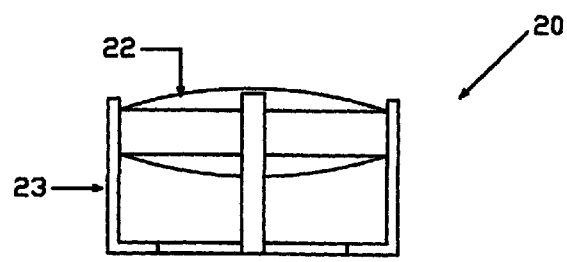
FIG. 3E is a side view of an evaporation system used as a water displacement means for the water displacement apparatus.
Figure 3F:
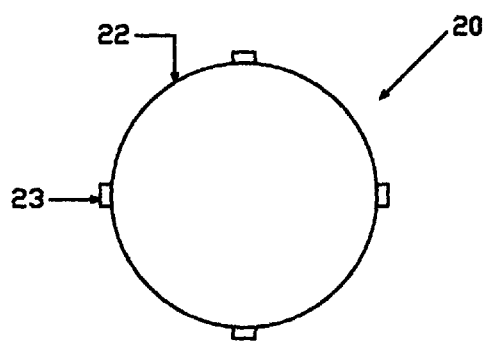
FIG. 3F is a top view of an evaporation system used as a water displacement means for the water displacement apparatus.
Figure 3G:
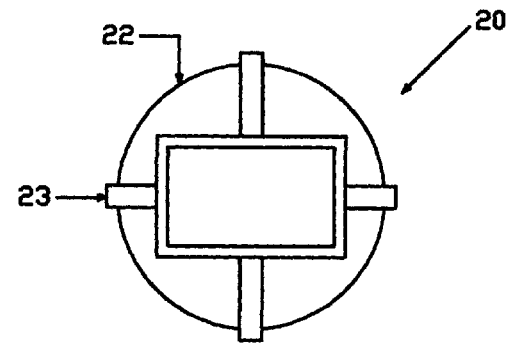
FIG. 3G is a bottom view of an evaporation system used as a water displacement means for the water displacement apparatus.

As may been seen in FIGS. 2A-2C, frame structure means 10 may comprise a base 11, a displacement support member 12, and a generator support member 13. The water container means 40 mounts on the base 11. The water displacement means 20 mounts of the displacement support member 12, while the electricity generation means 30 mounts on the generator support member 13. Displacement support member 12 and generator support member 13 mount to base 11.

As may be seen in FIGS. 3A-3F, the water displacement means 20 may be a conventional windmill system 21 for mechanically displacing water, or may be an evaporation system 22 for displacing water using the evaporation process. The evaporation system is basically a converging type lens member 23, which concentrates beams from the sun onto water within the water container means to evaporate the water. Additional lenses, such as a diverging type lens, or additional converging type lense mounted at angle, may be added to increase the amount of beams from the sun which are concentrated. Converging type lens member 23 has a lens support member 24, which mounts the lens upon displacement support member 12.

FIGS. 4A-4D demonstrates the water container means 40, which includes water container member 41 having an open end or outlet means 42, water transport member 43, and a water rotation means 44 having an inlet means 45. Water rotation means 44 includes a water rotatable member 46 mounted to a water engaging member 47, which is enclosed within the water rotation means 44. The water container member 41, water transport member 43, water rotation means 44, and water rotation inlet member 45 are hollow structures which allowing water to move within. The water container member 41 is a generally upright structure, while the water transport member 43 and rotation inlet means 45 are generally horizontal structures. Water transport member 43 may be seen to serve as an inlet means, allowing water to enter the water container member 41 from water rotation means 44. Water rotation inlet means 45 serves as an inlet for allowing water to enter rotation means 44. The water transport member 43 is connected to the water rotation means 44 so that water exiting rotation means 44 may enter water transport member 43, and thus into water container member 41. The water engaging member 47 is a typical type of paddle wheel which rotates as water engages it. Other types of water engaging members which perform the same function are commonly known to exist, and are capable of serving the same purpose as the type shown.

As may be seen in FIGS. 5A-5C, the electricity generation means 30 includes a conventional electricity generator 31, which is commonly known in the industry. The electricity generator 31 has a rotatable member 32 mounted on the generator shaft.

The conventional windmill system which may be used to pump the water may be comprised of a reciprocating displacement pump system commonly used throughout the world. It may include a typical piston submerged in a water filled pipe, which displaces water from the bottom of the pipe upward, as the piston moves upward and downward. The piston itself may have a type of check valve which allows water to move through the piston on the downward stroke, but is retained above the piston on the upward stroke. Water may re-enter the pipe through a second check valve located on the pipe inlet, which opens as the piston moves upward, and closed as the piston moves downward. This allows water to enter the pipe from a water reservoir as the piston moves upward, but keeps the water from exiting out the inlet as the piston moves downward. Water moves through the check valve and into the pipe through the action of atmospheric pressure. The reciprocating action of the piston is created by the windmill through a crank mechanism which is mounted to the rotating member at one end, and to the top of the piston rod at the opposite end. As mentioned, this type of reciprocating displacement pump system is very common, and has been used successfully to displace water upward for many, many years.

Figure 6A:
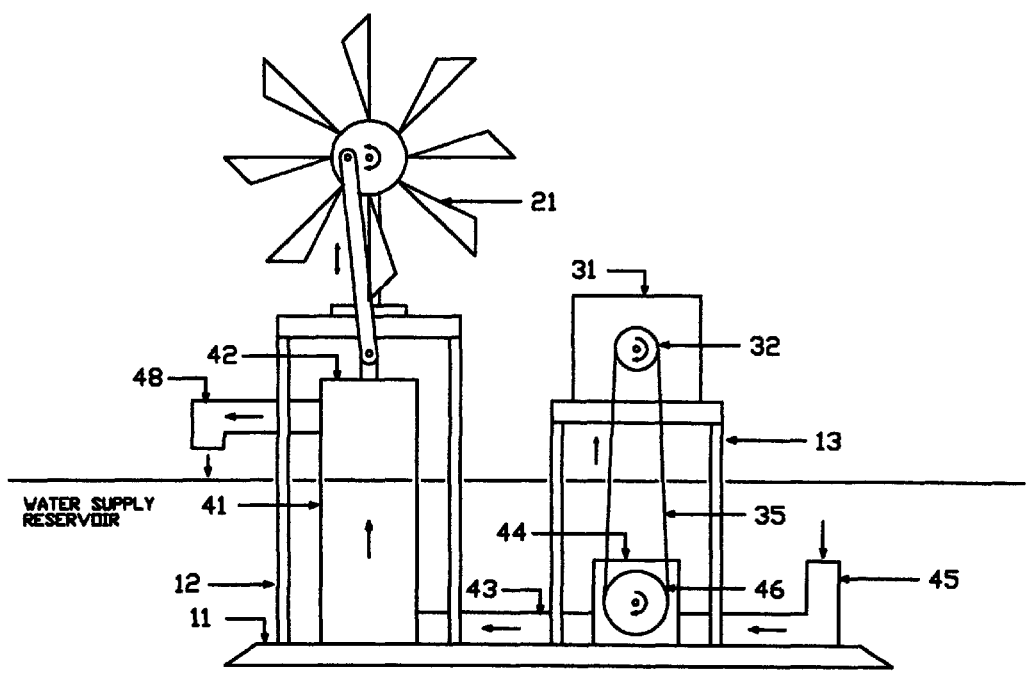
FIG. 6A is a front view of the operation of the water displacement apparatus using a conventional windmill system as a water displacement means.

FIG. 6A demonstrates the water displacement apparatus using a conventional windmill system for its operation. The conventional windmill system 21 mechanically displaces water from within water container member 41. Also as with most conventional windmill system, the system will be able to rotate to face the direction of the wind, similar to a wind vane. As may be seen, the water container means 40 may mount upon frame structure means 10, which may be placed in a water supply or reservoir. The water container member 41 may mount upon base 11, while the water displacement means 20 may mount upon displacement support member 12. The water container member is mounted so that the open end 42 of water container member 41 is above the level of the water within. The electricity generator means 30 may mount upon the generator support member 13, above the water level, but water tight generators may exist which are capable of being mounted below water level. Conventional windmill system 21 operates in a typical fashion, mechanically displacing or pumping water from water container member 41, preferably back into the surrounding water supply or reservoir, through an outlet member 48, or through open end 42. As water is removed from the water container member 41, water will travel into water container member 41 through water transport member 43. Water will then move into water transport member 43 from water rotation means 44. Water will then move from the water supply or reservoir into water rotation means 44 through water rotation inlet member 45. This movement of water through water rotation means 44 produces rotation in water engagement member 47, and thus water rotatable member 46. Rotatable member 46 is operatively connected to rotatable member 32 of electricity generation means 30 through closed loop connection member 35. As water engagement member 47 rotates, rotatable member 32 will rotate accordingly. Rotatable member 32 is mounted to the shaft of electricity generator 31 so that electricity is generated as it rotates. Electricity generator 31 is a common type of generator well known in the industry.

When a conventional windmill system is used as a water displacement means, it is also possible to construct the apparatus so that the flow of water through the apparatus is opposite of what is shown. For example, the inlet of the water container member may be connected directly to the water supply, while the outlet of the water container member may be connected directly to the water rotation means. In this configuration, the water will then flow out of the water container member directly to the water rotation means, with the water rotation means emptying the displaced water to the water supply. Water flow will occur as long as some part of the apparatus is open to the atmosphere. In still another scenario, the apparatus may be supplied with enough water so that the water supply is not necessary, at least until a later date. The outlet of the water container member may connect to the inlet of the water rotation means, while the outlet of the water rotation means may connect to the inlet of the water container member. This closed loop type of configuration will work as long as the water is exposed to the atmosphere at some point, and water is occasionally supplied back to the apparatus since some water loss is bound to occur. In all three instances, water is removed from the water container means by the water displacement means. It then flows through the water rotation means, and then returns back into the water container member. The only difference is the stage in which the water supply is used. Also in all three instances, atmospheric pressure is what pushes water into the water container member.

Figure 6B:
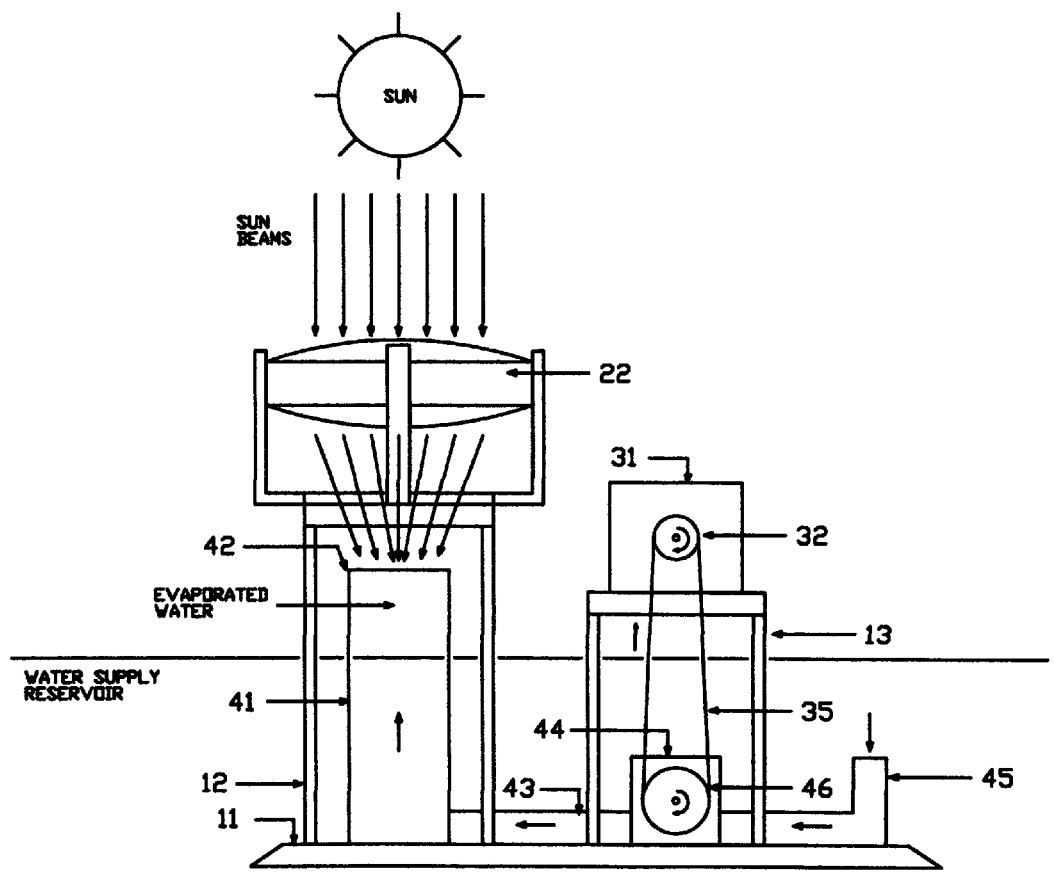
FIG. 6B is a front view of the operation of the water displacement apparatus using an evaporation system consisting of a converging type lens as a water displacement means.

FIG. 6B demonstrates a second type of water displacement means 20, which is an evaporation system 22. The operation of an evaporation system is different in that it displaces water from within water container 41 using the evaporation process. As seen, evaporation system 22 may have a converging type lens member 23 which mounts, using lens support member 24, upon displacement support member 12, so that converging type lens member 23 is positioned above the open end 42 of water container member 41. As beams from the sun hit converging lens member 23, the beams will be concentrated into the open end 42 of water container member 41 and onto the water contained inside. The concentrated beams will cause the water inside water container member 41 to heat up, and the evaporation process will begin once the water temperature reaches and exceeds the boiling temperature of water. This is similar to the way a magnifying glass may be used to concentrate sun beams onto an object, so that the object becomes heated and, in some cases, catches on fire. The evaporated water will then exit the water container member 41 into the surrounding atmosphere through open end 42. This evaporation or displacement of water will produce the same movement of water through rotation means 44 as described above for the conventional windmill system, which will in turn produce electricity using electricity generator 30.

Figure 7A:
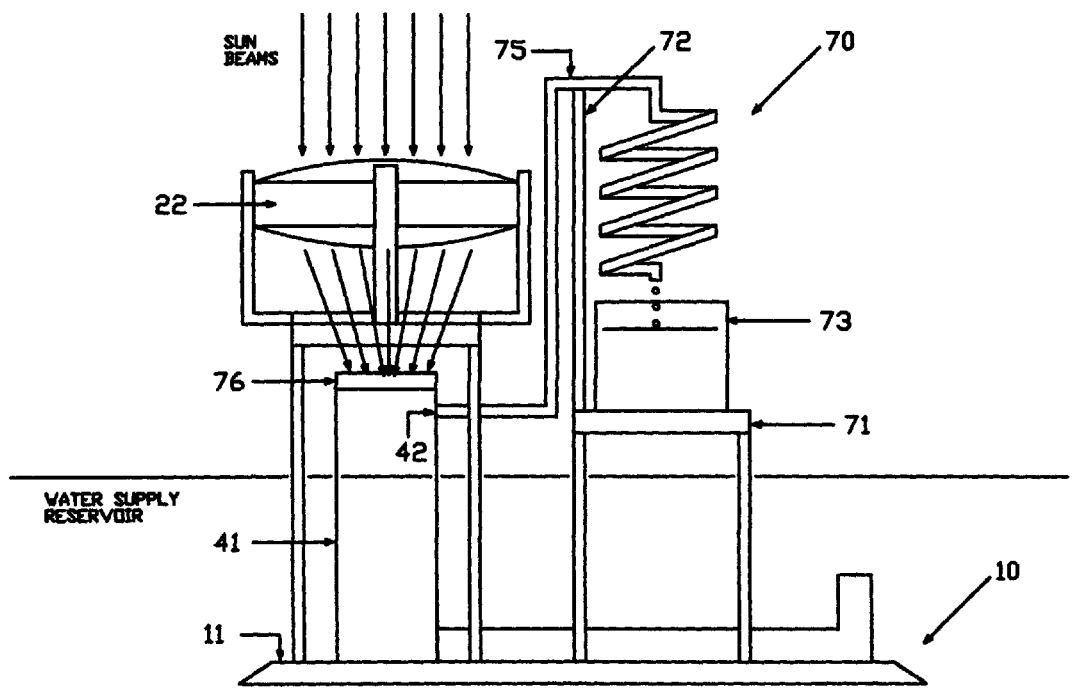
FIG. 7A is a front view of the water displacement apparatus showing a water condenser means used in conjunction with an evaporation system with the condensed water being saved for possible residential, commercial, and industrial use.

As may be seen in FIG. 7A, a water condenser means 70 may also operate in conjunction with the frame structure means 10 and the evaporation system 21. The water condenser means 70 includes a condenser base support 71 mounted on base 11 of frame structure means 10. In this configuration, the function of the apparatus is to purify water for possible residential, commercial, and/or industrial purposes. As may be seen, a condenser container 73 will mount on condenser support base 71. In this configuration, the water container member 41 will have a condenser clear cover 76 to cover the previously open end 42 of water container member 41, so that the evaporated water is directed through another open end 42, which connects the water container member 41 to a hollow condenser tube 75. Condenser tube 75 is a hollow tube which allows the evaporated water to travel within. As water travels from water container member 41 and through condenser tube 75, it is cooled sufficiently by the air surrounding the tube so that it becomes water again. Condenser tube 75 is supported by condenser support member 72, which is mounted upon condenser base support 71. The condensed water is collected in condenser container 73. The evaporation system will again channel sun beams into a concentrated area inside the water container member 41, through the clear cover 76. The water in the container will begin to evaporate, and the evaporated water will naturally move upward. The condenser clear cover 76 will direct the evaporated water into condenser tube 75. Part of the condenser tube 75 may be a coiled tube, through which the evaporated water moves. As the evaporated water moves through the condenser tube 75, it will become cooled by the surrounding air, and water will start to form. A different cooling medium, such as dirt or water, may surround the tube coils to cool the evaporated water faster. The water formed as a result of this conversion may be treated and used for commercial uses, such as drinking water, or industrial usage. There are other types of water condensers commonly known in the industry, any of which may be used with this system. The condenser means described herein is mainly for demonstration purposes. As may be seen, when the apparatus is used solely for water purification purposes, the water rotation means is not necessary.

Figure 7B:
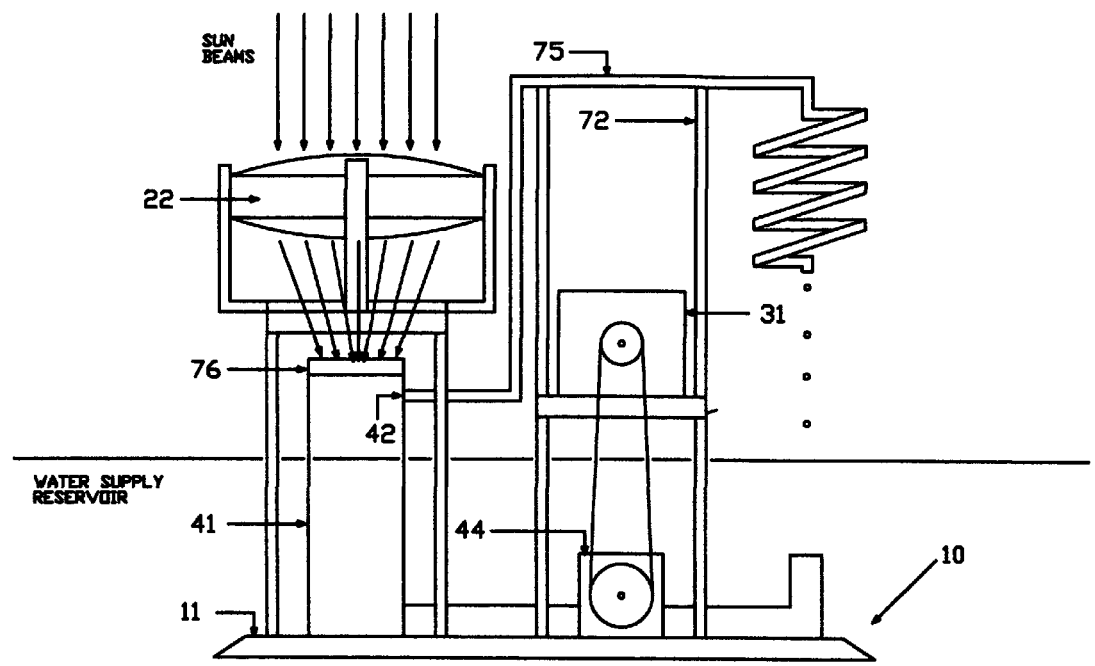
FIG. 7B is a front view of the water displacement apparatus showing a water condenser means used in conjunction with an evaporation system and electric generator means to generate electricity, with the condensed water being returned to the water supply or reservoir.

As may be seen in FIG. 7B, the water condenser means 70 may also be utilized when the apparatus is used to generate electricity. The condenser means will act the same as described above. In this configuration, the evaporated water may be added back to the water supply or reservoir, so that it re-used. It could also be captured into a container, if so desired. In this configuration, electricity generator 31 and water rotation means 44 are necessary.

Figure 8A:
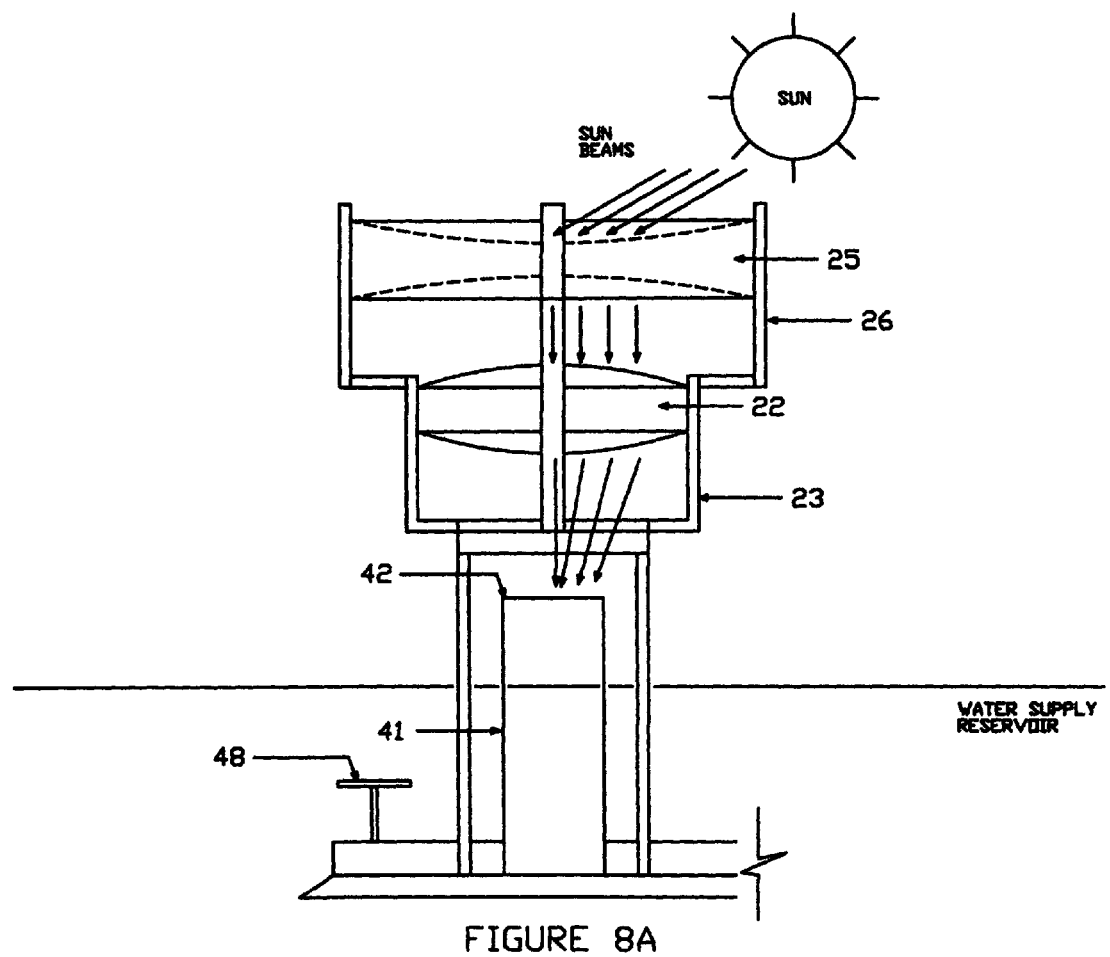
FIG. 8A is a front view of the water displacement apparatus using an evaporation system having a diverging type lens used in conjunction with a converging type lens.

As shown in FIG. 8A, a diverging type lens member 25 may be part of the evaporation system and will accept beams from the sun at any angle, and channel those beams of sun downward onto converging type lens member 22. Diverging type lens 25 has a diverging lens support 26 which is used to mount diverging type lens 25 above converging type lens member 22. The converging type lens member 22 will accept these downward heat beams generated by the diverging type lens member 25, in addition to those hitting it directly from the sun, and concentrate the beams into a smaller area. Also shown in FIG. 8A is a valve member 48 which may be part of water container means 40, which allows the water container means 40 to be flushed. A large water hose may be connected to the water container means and a large water storage tank. By opening the valve and letting flush water from the storage tank enter the system, debris such as sludge, dirt, or salt particles may be removed from the system. Debris will accumulate at the bottom of the system, especially when the evaporation system is used as a water displacement means. The flush water is used to remove this debris. Flush water will exit the apparatus either though the open end 42 of the water container member 41, through the rotation inlet member 45, or preferrably through both. It would be also possible to connect a pressurized water line to the inlet of the water rotation means, or to the inlet of the water container member, depending upon the configuration of the apparatus. This will allow the system to be flushed forward so that the flush water will exit the apparatus through the top of the water container member, or through the exit valve, if one is utilized.

Figure 8B:
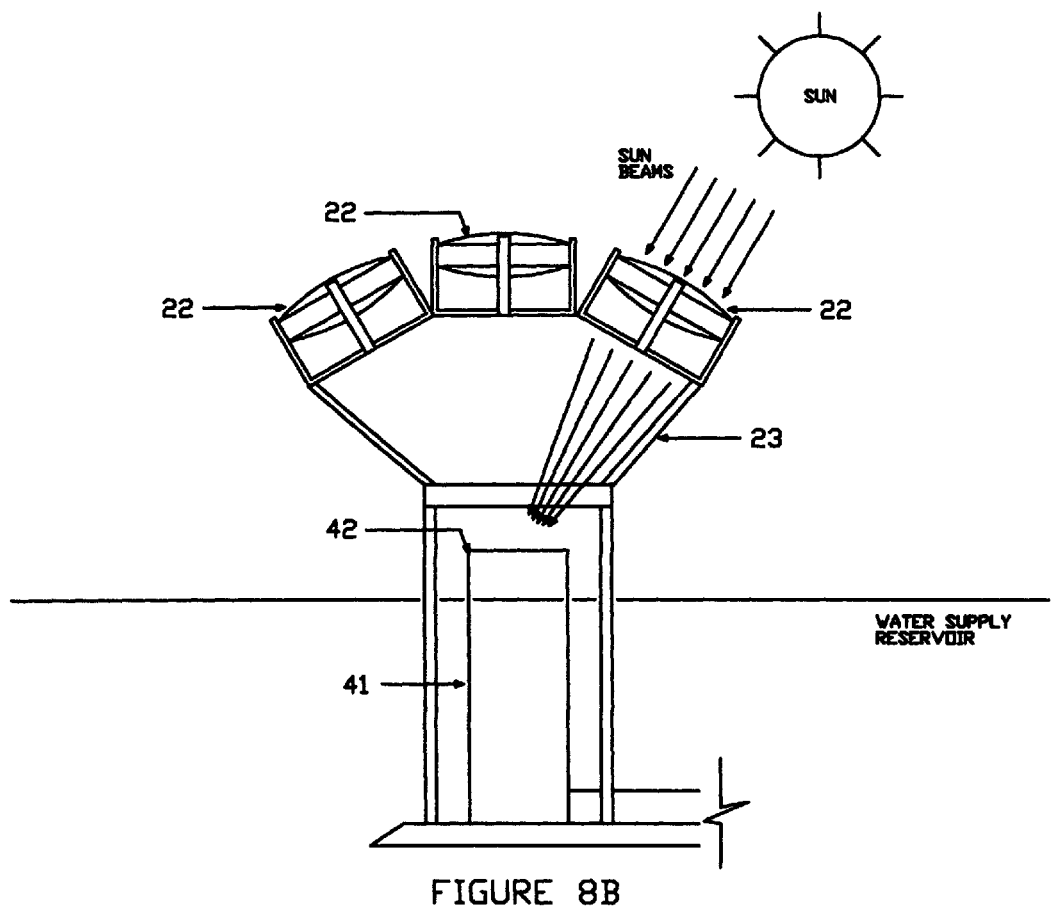
FIG. 8B is a front view of the water displacement apparatus using an evaporation system having multiple converging type lenses.

FIG. 8B shows how several converging lens type members 22 may be positioned above the open end 42 of water container member 41 so that sun beams from different angles may be concentrated to evaporate water from within water container member 41. This multiple lens configuration serves a similar function as the addition of a diverging type lens. A single lens could be manufactured which performs the same function the converging type lens and either the diverging type lens or the multiple converging lens configurations. There are lens in existence, such as a Fresnel Lens, which may prove useful in the evaporation system.

Figure 9A:
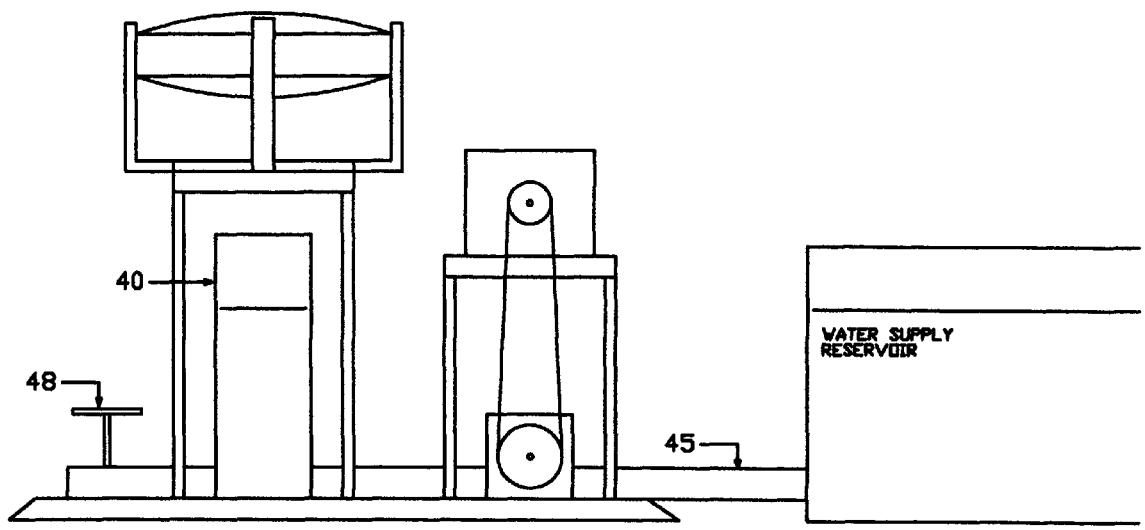
FIG. 9A is a front view of the water displacement apparatus using a water supply or reservoir located remotely from the apparatus.

FIG. 9A demonstrates a water supply or reservoir which does not surround the water container means 40, but is connected through rotatable inlet member 45. This may prove to be more desirable when a water condenser means 70 is used with the apparatus. FIG. 9A also shows a valve member 48 which may be part of water container means 40. Since the supply or reservoir is located remotely, the water container means 40 may be flushed just by opening the valve member 48 and letting water exit the system. Debris, such as sludge or salt particles, will then be easily removed from the system.

Figure 9B:
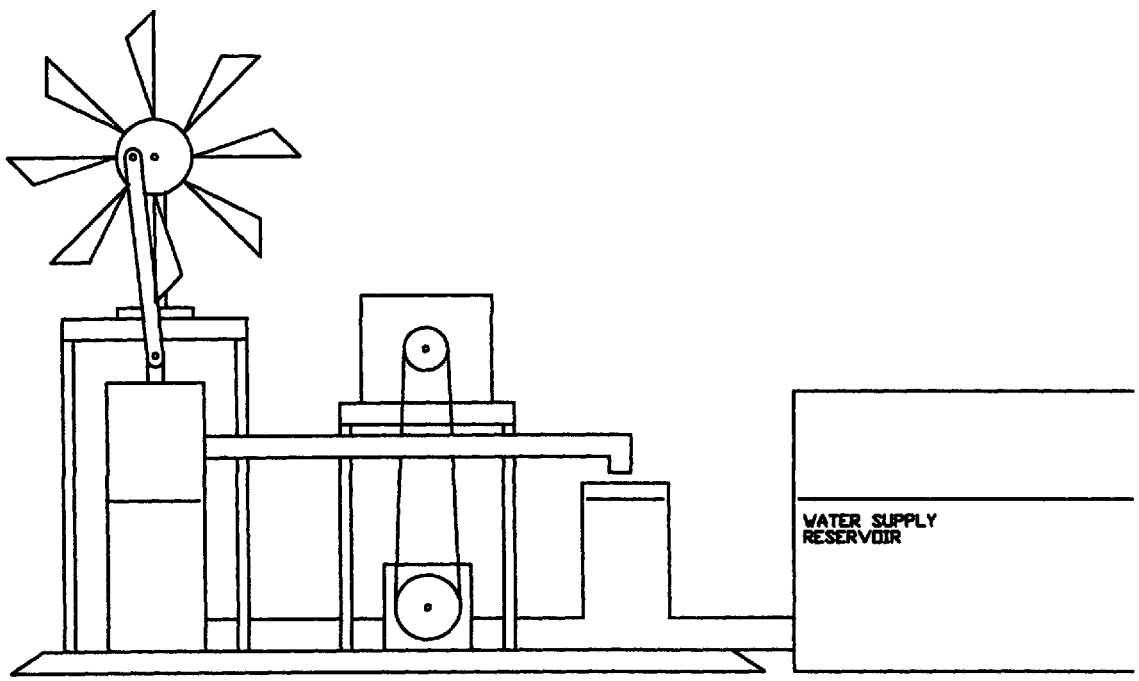
FIG. 9B is a front view of the water displacement apparatus returning water to the water supply or reservoir.

FIG. 9B demonstrates a water displacement apparatus which returns water to the remote water supply or reservoir. In the case shown, the water is being returned to a type of water container member located downstream of the reservoir, which acts the same as water being returned to the reservoir. If the reservoir is close enough by, then the water may be returned directly to it. The water may be returned to the remote supply or reservoir, and thus re-used, when using a convention windmill system as the water displacement means, or when an evaporation system is used as the water displacement means and is used in conjunction with a conventional condenser means. In either case, the return water should be placed before the water rotation means in order for the apparatus to function properly during the generation of electricity.

Figure 10:
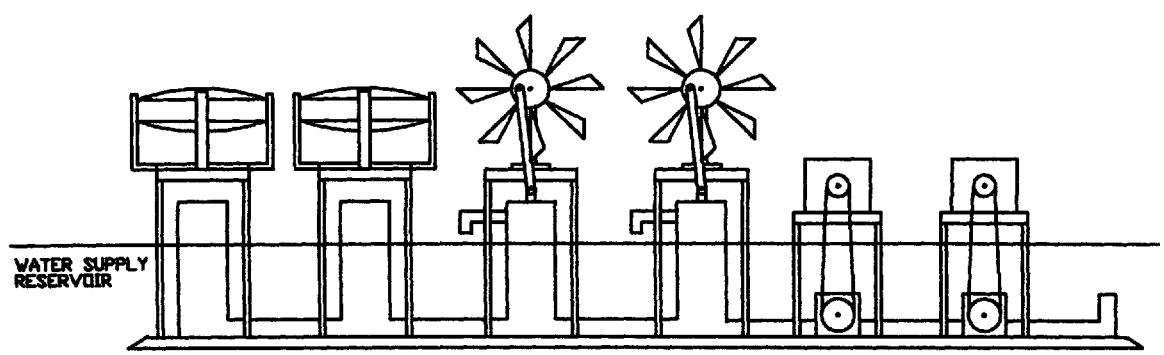
FIG. 10 is a front view of the water displacement apparatus showing how multiple components of the water displacement apparatus may be operatively connected together to displace larger amounts of water.

FIG. 10 demonstrates how several components of the frame structure means, the water displacement means, and the water container means may be operatively connected together so that larger amounts of water are displaced, and thus the movement of the water through the water rotatable member is faster. Hundreds, perhaps thousands of individual water displacement means 20 may be joined together to displace water simultaneously. Several water rotatable members may also be used so that the large flow of water turns multiple generators simultaneously. Also, having a conventional windmill system as part of a network of water displacement means may also serve to flush out debris, such as sludge or salt, which is left behind by an evaporation system. If a conventional windmill system is place as the last or end member of the configuration, it may be used to flush the entire transport line of the overall system. During periods of low or no sunlight, such as nighttime, only the conventional windmill system has a chance of operating, and the apparatus may therefore be considered self-flushing during windy and dark periods.

As mentioned previously and shown in the figures, the water rotation means of the water container means is needed only when the electricity generation means is part of the apparatus. It does not need to be part of each water container means when multiple units are connected together, as shown in FIG. 10, or when the apparatus is used only for water purification, as shown in FIG. 7. As mentioned, the basic function of this apparatus is to use water as a means for transferring energy from there sun and wind to an electric generator. Areas which have a sufficient amounts of sun, wind, and water, such as the gulf coast region, may utilize the apparatus as an inexpensive way of generating electricity. Areas which have a sufficient amount of sun and water may utilize the apparatus to purify water for possible residential, commercial, or industrial uses.

Many variations of the water displacement apparatus exist, along with the configurations described above. While it will be apparent that the preferred embodiment of the invention herein disclosed is well calculated to fulfill the objects above stated, it will be appreciated that the invention is susceptible to modification, variation, and change without departing from the proper scope or fair meaning of the subjoined claims.

I claim:

1. A water displacement apparatus comprising:
    a water container means comprising a water container member for containing water within, said water container member having an entrance area through which beams from the sun may pass into said water container member, an inlet means for allowing water from a water supply to enter said water container member; and an outlet means for allowing water from said water container member to exit said water container member;
    a water displacement means positioned generally above said water container member; said water displacement means being an evaporation system for evaporating water from within said water container member of said water container means, through said outlet of said water container member;
    a water condenser means connected to said outlet of said water container member of said water container means;
    whereby beams from the sun may pass into said water container member through said entrance area and evaporate the water from within, such that said evaporated water may move through said outlet of said water container member and through said water condenser means, with said evaporated water being sufficiently cooled as it travels through said condenser means so that it returns to a liquid form.

2. The water displacement apparatus as claimed in claim 1, said water displacement means further comprising a frame structure means having a base for supporting said water container means, a displacement support member for support said water displacement means, and a condenser support for supporting said water condenser means.

3. The water displacement apparatus as claimed in claim 1, said water condenser means of said water displacement apparatus further comprising a hollow coiled tube connected to said outlet of said water container member for cooling evaporated water so that the evaporated water is returned to liquid form as it travels inside; and container collection means placed at the end of said hollow coiled tube for collecting the resulting condensed liquid.

4. The water displacement apparatus as claimed in claim 1, said evaporation system comprising at least one concentrating lens for concentrating beams from the sun into the water located within said water container member, causing water within said water container member to be displaced by evaporation.

5. The water displacement apparatus as claimed in claim 4, said evaporation system further comprising an additional channeling lens for channeling beams from the sun onto said concentrating lens.

6. The water displacement apparatus as claimed in claim 1 whereby various components of said water displacement apparatus may be operatively connected together such that large amounts of water may be evaporated simultaneously and may be changed to liquid form and collected.

* * * * *